July 28, 1936.  A. A. KNECHT  2,048,871
GAS FILTER
Filed June 26, 1935
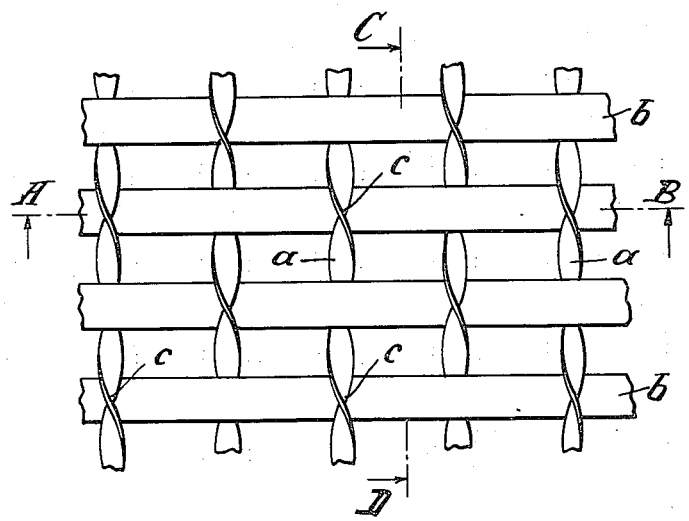
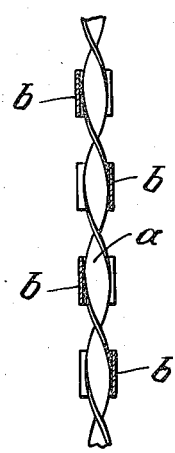
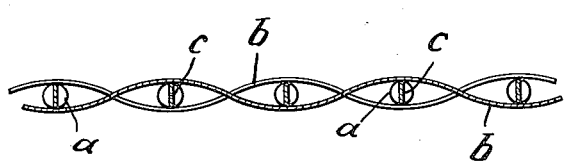
Inventor
Alfred Adolf Knecht
by Karl Michaelis
Atty.

Patented July 28, 1936

2,048,871

UNITED STATES PATENT OFFICE 2,048,871

GAS FILTER

Alfred Adolf Knecht, Stuttgart-Bad Cannstatt, Germany

Application June 26, 1935, Serial No. 28,507
In Germany July 18, 1934

6 Claims. (Cl. 183—69)

My invention relates to gas filters and more especially to means for filtering gases containing solids distributed therein, such as the air of combustion sucked into the cylinders of internal combustion engines. In such a filter the gas, such as air, to be cleaned must be subdivided into a large number of narrow streams, and eddies must be set up in these narrow gas streams in order to thereby separate out the solid and liquid impurities carried along by the gas and to cause these impurities to settle down in suitable places.

Gas filters of the kind described have been built up from irregularly juxtaposed and superposed metal strips such as metal shavings, or from flat wires and the like.

It is an object of my invention to improve such air filters by arranging these deflecting strips or wires in a regular manner, thereby enabling the filter to act uniformly upon the gas to be filtered and to thereby effect a perfect separation and dependable retaining of the impurities carried along by the air.

In order to attain this, I build up the filter from twisted metal bands, strips or flat wires, interlacing these wires by weaving to form a fabric, in which the most favorable position of the bands, strips or wires is maintained infinitely.

Since practical experiments have shown that considerable difficulties of a technical character are encountered in the production of such fabrics from twisted bands, strips or flat wires exclusively, I prefer constructing the new filter with one of the two systems of wires or strips (warp and weft wires), which are crossed to form the fabric, constituted by such twisted wires, while the wires forming the other system may be ordinary non-twisted wires the several twisted wires being twisted about the same angle between every two consecutive non-twisted wires.

Filter elements having these characteristics can readily be made in a very uniform manner and by superposing a plurality of such elements I am able to build up air filters which answer all requirements.

In the drawing affixed to this specification and forming part thereof a filter embodying my invention is illustrated diagrammatically by way of example.

In the drawing,

Fig. 1 is a plan view of a filter element, drawn to a greatly exaggerated scale, while Figs. 2 and 3 are cross-sections on the lines A—B and C—D in Fig. 1, respectively.

Referring to the drawing, $a$ are the regularly twisted bands, strips or flat wires, while $b$ are non-twisted bands, strips or flat wires crossing the wires $a$ at right angles and being interwoven with them in the usual manner. Preferably the twist of the twisted wires $a$ is so chosen that it is rationally proportionate to the pitch of the non-twisted wires. The drawing shows a twist of 90° of each wire $a$ between two consecutive wires $b$. Obviously, however, any other desired ratio might be chosen.

By the new arrangement angles $c$ acting like pockets, in which the solid and liquid matter carried along by the medium, such as air, to be cleaned, can settle down, are thus formed between the wires $a$ and $b$. The air passing at right angles across the filter elements on meeting the wound inclined surfaces of the wires $a$ is not only subdivided into individual threads, but eddies are also set up in this air, whereby the solid and liquid matter carried along by the air is flung towards those places, where no vigorous air currents and eddies exist.

These filter elements afford the further important advantage that, owing to the length of the way the air is compelled to travel across the many layers of filter elements, the air current as a whole is rendered uniform so that the noise created by the suction of the engine is damped.

Either all or only part of the wires constituting the new filter may be made of metal and I wish it to be understood that wires of any material will be suitable, which is sufficiently strong and resistant.

Various changes may be made in the details disclosed in the foregoing specification without departing from the invention or sacrificing the advantages thereof.

I claim:—

1. A gas filter comprising elements constituted by twisted flat wires, in combination with non-twisted wires extending at an angle to said flat wires, the several twisted wires being twisted about the same angle between every two consecutive non-twisted wires.

2. A gas filter comprising elements constituted by twisted flat wires, in combination with non-twisted flat wires extending at an angle thereto, the several twisted wires being twisted about the same angle between every two consecutive non-twisted wires.

3. A gas filter comprising elements consisting of a fabric, wherein a system of twisted flat wires is combined with a system of non-twisted wires, the several twisted wires being twisted about the same angle between every two consecutive non-twisted wires.

4. A gas filter comprising elements consisting of a fabric, wherein a system of twisted flat wires is combined with a system of non-twisted flat wires, the several twisted wires being twisted about the same angle between every two consecutive non-twisted wires.

5. A gas filter comprising elements consisting of a fabric, wherein a system of twisted flat wires is combined with a system of non-twisted wires, the several twisted wires being twisted by 90° between every two consecutive non-twisted wires.

6. A gas filter comprising elements consisting of a fabric, wherein a system of twisted flat wires is combined with a system of non-twisted wires, the several twisted wires being twisted by a rational multiple of 90° between every two consecutive non-twisted wires.

ALFRED ADOLF KNECHT.